United States Patent
Davis (10) Patent No.: US 11,261,896 B2
(45) Date of Patent: Mar. 1, 2022

(54) TAMPER RESISTANT IDENTIFICATION RIVETS AND TAMPER EVIDENCING ELEMENTS THEREOF

(71) Applicant: Joshua Paul Davis, Plano, TX (US)

(72) Inventor: Joshua Paul Davis, Plano, TX (US)

(*) Notice: Subject to any disclaimer, the term of this patent is extended or adjusted under 35 U.S.C. 154(b) by 292 days.

(21) Appl. No.: 16/728,821

(22) Filed: Dec. 27, 2019

(65) Prior Publication Data
US 2021/0199146 A1 Jul. 1, 2021

(51) Int. Cl.
- F16B 13/04 (2006.01)
- F16B 19/06 (2006.01)
- F16B 19/04 (2006.01)

(52) U.S. Cl.
CPC ........ *F16B 19/06* (2013.01); *F16B 2019/045* (2013.01)

(58) Field of Classification Search
USPC .......................................................... 411/34
See application file for complete search history.

(56) References Cited

U.S. PATENT DOCUMENTS

| | | | | |
|---|---|---|---|---|
| 8,608,086 B1* | 12/2013 | Mizzo | ............... | G06K 19/07758 235/492 |
| 9,373,015 B2* | 6/2016 | Swenson, Jr. | ...... | G06K 7/10376 |
| 10,470,531 B1* | 11/2019 | Yanes | ................... | A44C 15/006 |
| 10,505,726 B1 | 12/2019 | Andon et al. | | |
| 2010/0325926 A1* | 12/2010 | Hilpert | .................. | A01K 11/001 40/301 |
| 2011/0067623 A1* | 3/2011 | Fagan | ..................... | G09F 11/23 116/201 |
| 2012/0217307 A1* | 8/2012 | Martin | ................... | G06K 19/02 235/492 |
| 2012/0285052 A1* | 11/2012 | Baker | ....................... | G09F 3/02 40/27 |
| 2013/0075676 A1* | 3/2013 | Purdy | .................. | B42D 25/328 252/586 |
| 2013/0096389 A1* | 4/2013 | Katarow | .............. | A61B 5/6802 600/300 |
| 2013/0284814 A1* | 10/2013 | Huang | ................. | G06K 19/027 235/492 |
| 2016/0003286 A1* | 1/2016 | Capco | ................... | F16B 33/008 411/34 |
| 2016/0172742 A1* | 6/2016 | Forster | ................. | H01Q 1/2208 343/878 |
| 2016/0199231 A1* | 7/2016 | Capra | ................... | A61F 5/0111 602/12 |

\* cited by examiner

*Primary Examiner* — Gary W Estremsky
(74) *Attorney, Agent, or Firm* — Slater Matsil, LLP (57) ABSTRACT

According to an embodiment, a rivet includes a first cap having a front side and a back side. The first cap includes a compressed region or a slotted region between a first edge of the first cap and a second edge of the first cap, a unique identifier on the front side of the first cap, a protruding portion extending from a central region on the back side of the first cap, a foam layer adhered to the back side of the first cap with a first layer of adhesive, and a protective film adhered to the foam layer with a second layer of adhesive.

20 Claims, 8 Drawing Sheets

TAMPER RESISTANT IDENTIFICATION RIVETS AND TAMPER EVIDENCING ELEMENTS THEREOF

TECHNICAL FIELD

The present invention relates generally to rivets, and in particular embodiments to tamper resistant identification rivets having tamper evidencing elements thereof.

BACKGROUND

The resale of designer and luxury consumer products such as athletic shoes, purses, and jackets is a multi-billion dollar business. The resale of sneakers alone is estimated by Cowan & Co to be a two billion dollar business and is projected to triple in size over the next several years, reaching more than six billion dollars by 2025.

Certifications of authenticity are needed to create a robust reseller market for sneakers or other apparel. Currently companies such as Goat.com and Stockx.com provide certificates by relying on the United States Postal Service as a secure channel where: (1) a reseller sends the sneakers to an intermediary for inspection; and (2) the intermediary inspects the sneakers and forwards them to a buyer with a paper certificate of authenticity. Certificates of this nature cannot be reused, for example, when the buyer desires to resell the product, because there is no authentication mechanism placed on the product itself and there is no global database for tracking or verifying the certificate provided with the product.

Currently the only way to guarantee the authenticity of a product is by obtaining a new certificate for each sale of that product. This process requires reliance on a third party intermediary to broker a transaction between the seller and the buyer in which the seller is required to ship the item to be sold to the intermediary for inspection and authentication, and the intermediary is required to ship the item with a certificate of authenticity to the buyer. This process is time consuming and, in the event the same product is sold multiple times, unnecessarily duplicative and expensive.

SUMMARY

According to an embodiment, a rivet includes a first cap having a front side and a back side. The first cap includes a compressed region or a slotted region between a first edge of the first cap and a second edge of the first cap, a unique identifier on the front side of the first cap, a protruding portion extending from a central region on the back side of the first cap, a foam layer adhered to the back side of the first cap with a first layer of adhesive, and a protective film adhered to the foam layer with a second layer of adhesive.

According to another embodiment, a rivet includes a first cap comprising an upper portion and a protruding portion, wherein the upper portion and the protruding portion each include a metal material. The upper portion further includes at least one compressed region or at least one perforated region, a unique identifier on an upper surface of the upper portion, wherein the unique identifier comprises a unique serial number that corresponds to a non-fungible token certificate on a blockchain, a foam layer adhered to a lower surface of the upper portion, opposite the upper surface, wherein the foam layer is adhered by a first layer of adhesive, and a second layer of adhesive on the foam layer, wherein the second layer of adhesive is configured to adhere the first cap to an article for sale. The second cap includes a primary portion and a barrel portion extending from the primary portion, wherein the second cap is configured to mate with the first cap when the rivet is attached to the article.

According to a further embodiment, a tamper resistant rivet includes a cap. The cap includes a metal material, and the metal material includes at least three compressed lines. Each of the at least three compressed lines includes a curved line extending from a first location on an outer edge of the cap towards a central region of the cap to a second location on the outer edge of the cap. The cap further includes a unique identifier on an upper surface of the cap, wherein the unique identifier includes a unique serial number that corresponds to a non-fungible token certificate on a blockchain. The cap further includes at least three foam segments adhered to a lower surface, opposite the upper surface, of the cap in regions between the at least three compressed lines, wherein the at least three foam segments are adhered by a first adhesive, a second adhesive on the at least three foam segments, wherein the second adhesive is configured to adhere the cap to a resale item, and a protective film covering each of the at least three foam segments, wherein the protective film is adhered to the at least three foam segments by the second adhesive.

An advantage of embodiments of the present invention is the elimination of the need to use a traditional mail/shipping system to sell/buy certified authentic products. A further advantage of the described embodiments is the creation of reusable or transferrable certificates of authenticity with associated tags on the authenticated products themselves. A further advantage of the described embodiments is a tag, or identification rivet, with tamper resistant features that any purchaser can examine to obtain assurance of the authenticity of a product. The advantages of embodiments of the invention allow for a more robust reseller market than is currently available.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely rivets for shoes, clothing and other consumer products, and, in particular embodiments, to tamper resistant identification rivets having tamper evidencing elements used in the authentication of such products. Other uses for the identification rivets are expressly included within the scope of the invention.

Figure 1:
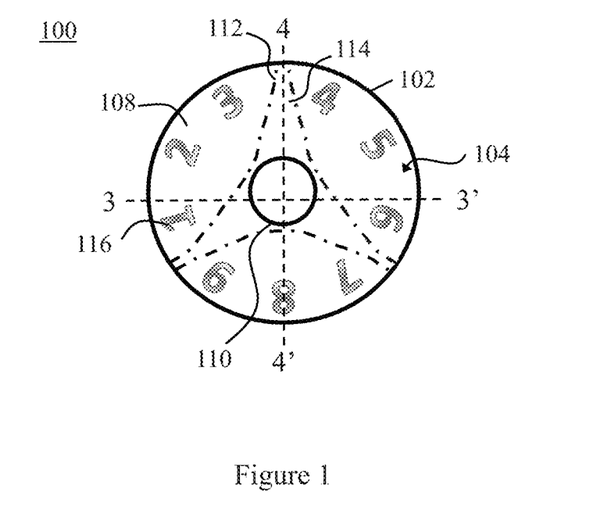
FIG. 1 illustrates a top view of an identification rivet according to an embodiment.

FIG. 1 illustrates a top view of an identification rivet 100 according to an embodiment of the present invention. The identification rivet 100 includes a cap 102 having a front side 104 and a back side 106 (see FIG. 2). The upper portion of the cap 102 illustrated in FIG. 1 has a circular shape. Other shapes, including but not limited to ovals, squares, rectangles, stars, etc. are also possible. The identification rivet 100 may include a metal or metal-based material, for example, aluminum or bronze. Other materials known to those of ordinary skill in the art in the manufacture of rivets may also be used.

The identification rivet wo of FIG. 1 further includes a peripheral region 108 and a central region no. The peripheral region 108 and the central region no may be formed as two separate pieces using the same material or different materials. For example, the peripheral region 108 may include aluminum and the central region no may include bronze. In other embodiments, the peripheral region 108 and the central region no may be formed as a single piece or as more than two pieces. In addition, the peripheral region 108 and the central region no may have the same shape or different shapes.

Figure 2:
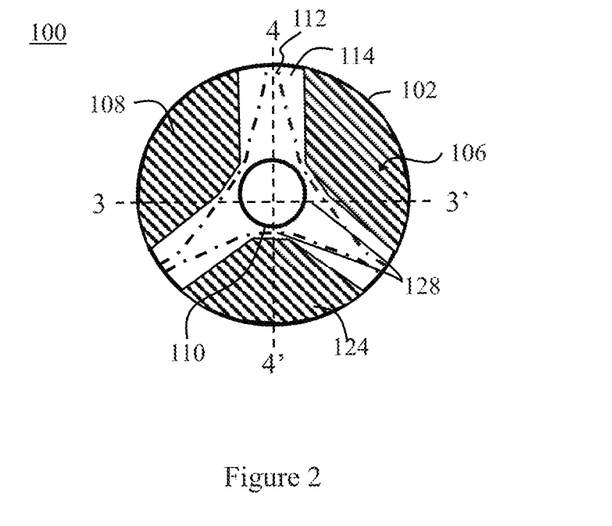
FIG. 2 illustrates a bottom view of the identification rivet of FIG. 1.

The identification rivet 100 of FIG. 1 further includes at least one first weakened region 112 and at least one second weakened region 114. In the embodiment of FIG. 1, the first weakened region 112 includes one or more crimped lines that both begin and terminate at edges of the peripheral region 108 of identification rivet 100. The first weakened regions 112 are portions of the material of the peripheral region 108 that have been crimped or compressed by a machine during fabrication. For example, a metal punch may be used to form the first weakened regions 112 in the upper portion of the cap 102. In various embodiments, the peripheral region 108 is embossed using a stamping process. The stamping process may produce raised (embossed) or sunken (debossed) designs in the material of the peripheral region 108 using complementary male and female stamping dies for providing the desired design. The identification rivet is drawn through the male and female stamping dies to produce the desired pattern or design on the peripheral region 108. A combination of pressure and heat may be used during the stamping process. In an embodiment, the length of each first weakened region 112 is approximately 3.5 mm and the width of each first weakened region 112 is approximately 0.1 mm to 0.2 mm. The second weakened regions 114 are regions surrounding the first weakened regions 112. These regions may be essentially rectangular in shape as illustrated in FIG. 2, or these regions may have other shapes. Additional detail for the first and second weakened regions 112 and 114 is provided herein with respect to FIG. 2.

The identification rivet 100 further includes a unique serial number 116 that corresponds to a non-fungible token (NFT) certificate recorded on a blockchain. Examples of how to build NFTs on the Ethereum blockchain are provided by free, open standards ERC-721 and ERC-1155, incorporated herein by reference. These token standards may be used to create one-of-a-kind digital collectables or digital certificates. The unique serial number 116 corresponds to a longer hash address on the Ethereum blockchain. A mobile application is able to index the unique serial number 116 of the identification rivet 100 with its corresponding hash address.

Ownership of an item's certificate of authenticity is secured by a digital wallet within the mobile application. This digital wallet holds a user's private key and provides methods for backing up the key. This private key allows a user to sign a digital transaction which can be sent to the blockchain. Such transactions allow for the recording of transfer of ownership to take place amongst the parties. The user interface allows for a user to transfer ownership of an item's certificate to another user at the time the physical item is sold. This process can be considered analogous to the transferring of a vehicle's title when an owner provides the keys to the vehicle to the new buyer. In the same way that the buyer and seller would notify the state when such a transaction occurs, the seller sends notification of a transaction to the blockchain to indicate that ownership of the item has changed.

The mobile application facilitates users to hold a wallet. The wallet facilitates users to hold a key. The key facilitates users to sign a transaction. The transaction facilitates a transfer of owership of an NET, such an an ERC-721 or ERC-1155 token. The token represents an item's certificate of authenticity. The ownership chain for the item's certificate of authenticity allows for tracing of a certificate from its origination to its current owner. The transfer of the token allows the mobile application to update ownership of the certificate of authenticity.

In FIG. 1, the unique serial number 116 is 123456789. Any combination of numbers, letters, and/or other characters may be used for the unique serial number 116. In addition, the elements of the unique serial number 116 may be placed on the front side 104 of the cap 102 in any manner or arrangement visible to a consumer. The unique serial number 116 may be placed on the front side 104 of the cap 102 by any known process including but not limited to printing, including 3D printing, imprinting, etching, embossing, and/or debossing. The placement of the unique serial number 116 may be performed at the same time as the formation of the first weakened regions 112 or it may be performed at some other point in the process of forming the identification rivet 100.

The unique serial number 116 provides for a one-time authentication process in the resale of products. A seller, reseller, or other authentication party authenticates the product, such as a pair of shoes or a designer purse, attaches an identification rivet 100 including a unique serial number 116, and provides the tagged product and a reusable certificate associated with the identification rivet 100 to the buyer. If the buyer subsequently sells the product to another purchaser, the identification rivet attached to the product along with the associated certificate assure the next purchaser of the authenticity of the product without having to go through another authentication process. As discussed above, the blockchain stores the certificate of authenticity and its associated details. In addition, the mobile application servers may store pictures of the item, details of the item including ownership history, and an index of the unique serial number 116 with a blockchain certificate. The mobile application combines two databases together to create one source for verifying an item's authenticity.

Figure 3:
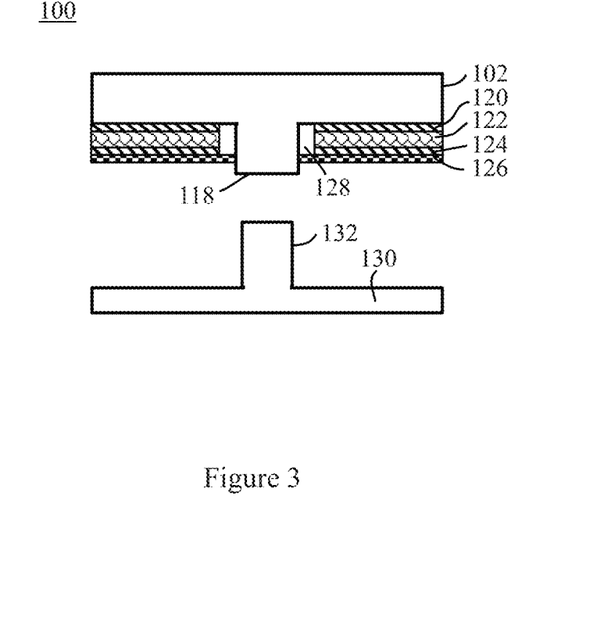
FIG. 3 illustrates a cross-sectional view along line 3-3' of FIGS. 1 and 2.
Figure 4:
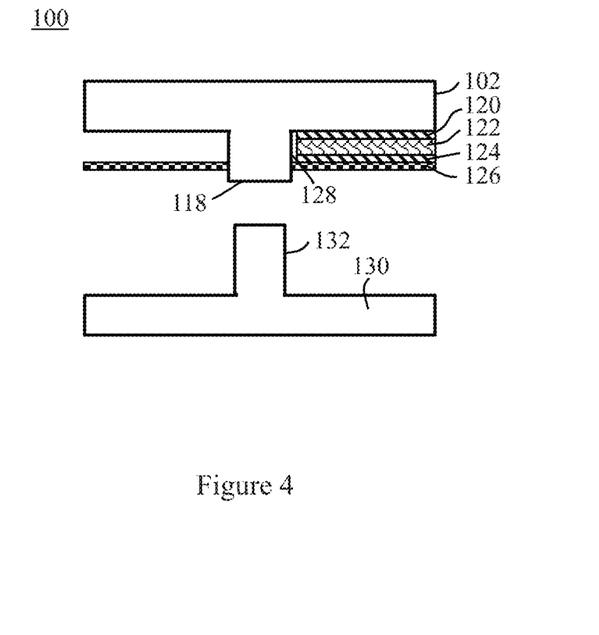
FIG. 4 illustrates a cross-sectional view along line 4-4' of FIGS. 1 and 2.

FIG. 2 illustrates a bottom view of the identification rivet 100 of FIG. 1 after removal of a protective anti-stick film 126 (described with respect to FIGS. 3 and 4). FIG. 2 illustrates the location of the first weakened regions 112 and the second weakened regions 114 on the back side 106 of the cap 102. FIG. 2 further illustrates a second layer of adhesive 124 formed in areas of the peripheral region 108 surrounding the second weakened regions 114 on the back side 106 of the cap 102. The second layer of adhesive 124 is part of a foam layer arrangement which will be described with respect to FIGS. 3 and 4. The arrangement of the first weakened regions 112, the second weakened regions 114, and the foam layer arrangement (illustrated by the second layer of adhesive 124) allows for tear lines to form more easily along the first and second weakened regions 112 and 114. This prevents or reduces the likelihood that a tear in the identification rivet 100 will terminate at the central region no. In the event the identification rivet wo is tampered with but a tear is not formed, the existence of the first and second weakened regions 112 and 114 still will result in a deformation in the upper portion of the cap 102 that will be visible and obvious to a purchaser.

FIG. 3 is a cross-sectional view of the identification rivet wo taken along line 3-3' of FIGS. 1 and 2. FIG. 4 is a cross-sectional view of the identification rivet wo taken along line 4-4' of FIGS. 1 and 2. As illustrated in FIGS. 3 and 4, the cap 102 includes a protruding portion 118 extending from the upper portion of the cap 102. The cap 102 further includes a first layer of adhesive 120 on a bottom surface of the upper portion of the cap 102. The upper portion of the cap 102 may be, for example, a metal material. The cap 102 further includes a foam layer 122 adhered to the metal material using the first layer of adhesive 120, a second layer of adhesive 124 on a bottom surface of the foam layer 122, and a protective anti-stick film 126 temporarily attached to the second layer of adhesive 124 to protect the second layer of adhesive 124 until it is adhered to a consumer product (not shown; see FIG. 15). The foam layer 122 may be a thin layer of foam, for example, about 1 mm thick. In an embodiment, the foam layer 122 is a durable material that is capable of withstanding normal usage of the consumer product to which it will be attached. The foam layer 122 may include one or more materials that are capable of withstanding natural embrittlement effects from oxidation and hydrolysis (i.e., long-term exposure to oxygen and moisture in the air) and/or are resistant to UV radiation. In various embodiments, the foam layer 122 is a closed-cell ethylene-vinyl-acetate (EVA). In various embodiments, the foam layer 122 is expanded thermoplastic polyurethane (eTPU).

As illustrated in FIGS. 3 and 4, the first layer of adhesive 120, the foam layer 122, and the second layer of adhesive 124 are not formed on the first weakened regions 112 and the second weakened regions 114, leaving a gap 128. Placement of the first layer of adhesive 120, the foam layer 122, and the second layer of adhesive 124 over the first and second weakened regions 112 and 114 is possible but would act to strengthen these regions and lessen the tamper resistance of the identification rivet 100.

In some embodiments, the first layer of adhesive 120 is a strong adhesive such as an epoxy-based adhesive suitable for bonding the material of the cap 102 to the foam layer 122. In various embodiments, the material of the cap 102 is non-porous and the foam layer 122 is porous. The non-porous material of the cap 102, the first layer of adhesive 120, and the foam layer 122 may be subjected to a curing process to obtain a suitably strong bond between the upper portion of the cap 102 and the foam layer 122. In various embodiments, the bond between the upper portion of the cap 102 and the foam layer 122 cannot be cleanly broken, so that the upper portion of the cap 102 cannot be removed from the foam layer 122 without damaging the foam layer 122. The first layer of adhesive 120 may be any adhesive material known to a person of ordinary skill in the art suitable to achieve the purpose of the described embodiments.

In some embodiments, the second layer of adhesive 124 is a strong adhesive such as an epoxy-based adhesive suitable for bonding the foam layer 122 to the surface material of the consumer product, such as leather. The second layer of adhesive 124 has properties sufficient to form a strong bond between the foam layer 122 and the surface of the consumer product (not shown; see FIG. 15) with the typical pressure exerted on the identification rivet wo when it is attached to the consumer product using, for example, a rivet gun. In various embodiments, the bond between the foam layer 122 and the consumer product cannot be cleanly broken, so that the foam layer 122 cannot be separated from the consumer product without damaging the foam layer 122. The second layer of adhesive 124 may be any adhesive material known to a person of ordinary skill in the art suitable to achieve the purpose of the described embodiments.

In an embodiment, the protective anti-stick film 126 protects the second layer of adhesive 124 and may include a polytetrafluoroethylene-based material, for example. The protective anti-stick film 126 can be easily peeled away to expose the second layer of adhesive 124 at the time it is to be attached to the consumer product, for example, using a rivet gun. Other protective anti-stick film materials suitable to achieve protection of and easy removal from the second layer of adhesive 124 may also be used.

As shown in FIGS. 3 and 4, the identification rivet 100 is a double cap rivet including the cap 102 and a second cap 130 including a barrel 132 that is inserted into the protruding portion 118 to attach to the cap 102 from an opposite side of the product being tagged. In other embodiments, the identification rivet 100 may be a single cap rivet.

In various embodiments, the identification rivet 100 is sized to fit securely over and within an existing hole in a product, for example, in an existing shoelace hole in a sneaker and adhering to the surface material or materials of the sneaker. In one example, the front side 104 of the cap 102 has a diameter ranging from 0.75 cm to 1.25 cm. The protruding portion 118 of the cap 102 has a diameter ranging from 0.2 cm to 0.5 cm. The second cap 130 has a diameter ranging from 0.75 cm to 1.25 cm. The barrel 132 of the cap 130 has a diameter and a height sufficient to ensure the identification rivet 100 securely attaches to the sneaker once the cap 102 and the second cap 130 are pressed together to attach to the sneaker. For example, the diameter of the barrel 132 ranges from 0.15 cm to 0.3 cm, and the height of the barrel 132 ranges from 0.2 cm to 0.4 cm.

Figure 5:
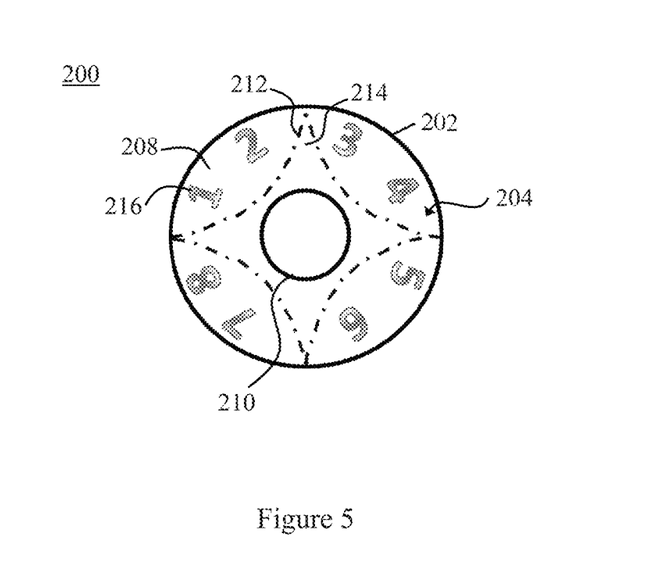
FIG. 5 illustrates a top view of an identification rivet according to another embodiment.
Figure 6:
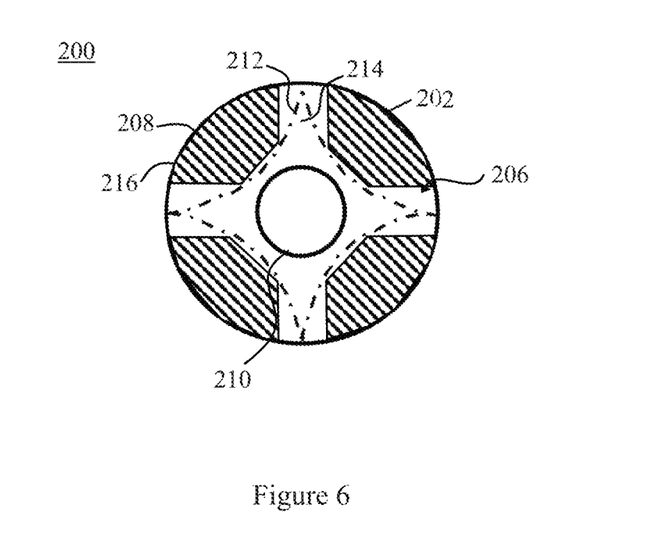
FIG. 6 illustrates a bottom view of the identification rivet of FIG. 5.

Another embodiment of an identification rivet is illustrated with respect to FIGS. 5 and 6. Similar to the embodiment described in FIGS. 1-4, the identification rivet 200 includes a cap 202 having a front side 204 and a back side 206, a peripheral region 208 and a central region 210, first weakened regions 212 and second weakened regions 214, and a unique serial number 216. The embodiment of FIGS. 5 and 6 illustrates different shapes and arrangements of the first and second weakened regions 212 and 214, and a different arrangement of the unique serial number 216 of 12345678. The invention is not limited to the illustrated shapes and arrangements; other shapes and arrangements of these elements are also fully within the scope of the present invention. Reference to the teachings regarding like features of FIG. 1-4 are incorporated herein for the features of FIGS. 5 and 6.

Another embodiment of an identification rivet is illustrated with respect to FIGS. 7-10. The identification rivet 300 includes a cap 302 having a front side 304 and a back side 306 (see FIG. 8). The upper portion of the cap 302 illustrated in FIG. 7 has a circular shape. Other shapes, including but not limited to ovals, squares, rectangles, stars, etc. are also possible. The identification rivet 300 may include a metal or metal-based material, for example, aluminum or bronze. Other materials known to those of ordinary skill in the art in the manufacture of rivets may also be used.

Figure 7:
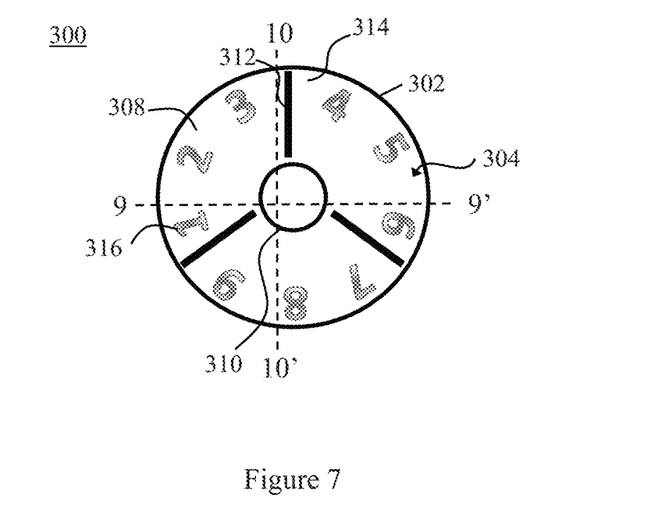
FIG. 7 illustrates a top view of an identification rivet according to another embodiment.

The identification rivet 300 of FIG. 7 further includes a peripheral region 308 and a central region 310. The peripheral region 308 and the central region 310 may be formed as two separate pieces using the same material or different materials. For example, the peripheral region 308 may include aluminum and the central region 310 may include bronze. In other embodiments, the peripheral region 308 and the central region 310 may be formed as a single piece or as more than two pieces. In addition, the peripheral region 308 and the central region 310 may have the same shape or different shapes.

Figure 8:
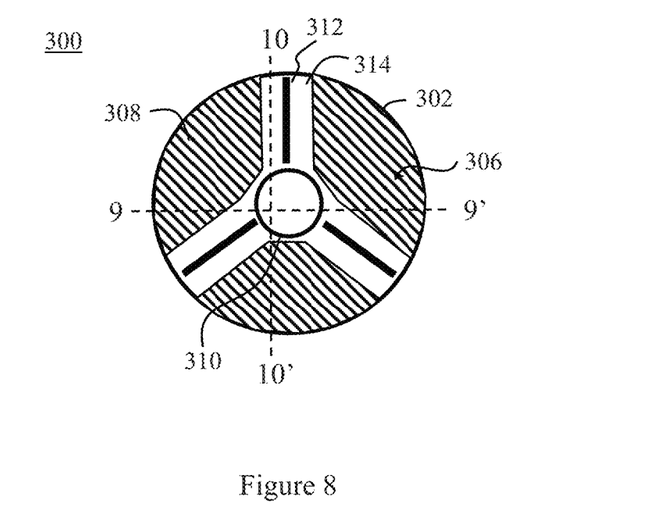
FIG. 8 illustrates a bottom view of the identification rivet of FIG. 7.

The identification rivet 300 of FIG. 7 further includes at least one first weakened region 312 and at least one second weakened region 314. In the embodiment of FIG. 7, each first weakened region 312 includes one or more perforations or slots in the upper portion of the cap 302. In various embodiments, the first weakened regions 312 are formed by removing portions of the material of the peripheral region 308 by a machine during fabrication. For example, material may be etched away to form the first weakened regions 312 in the upper portion of the cap 302. In various embodiments, material of the peripheral region 308 may be removed using a stamping process in which complementary male and female stamping dies are used for providing the desired design. The identification rivet is drawn through the male and female stamping dies to produce the desired pattern or design on the peripheral region 108. A combination of pressure and heat may be used during the stamping process to fully remove material of the peripheral region 308 to form the perforations or slots of the first weakened region 312. Each first weakened region 312 may include a single perforation or slot or multiple perforations or slots in one or more rows and/or columns. In some embodiments, the first weakened regions 312 do not extend to interior or exterior edges of the peripheral region 308. The second weakened regions 314 are regions surrounding the first weakened regions 312. These regions may be primarily rectangular in shape as illustrated in FIG. 8, or these regions may have other shapes. Additional detail for the first and second weakened regions 312 and 314 is provided herein with respect to FIG. 8. In some embodiments, material of the upper portion of the cap 302 outside the first and second weakened regions 312 and 314 is not removed, so that those portions of the cap 302 are stronger than the portions within the first and second weakened regions 312 and 314.

The identification rivet 300 further includes a unique serial number 316 that corresponds to a non-fungible token (NFT) certificate recorded on a blockchain as described with respect to the unique serial number 116 of the identification rivet 100, which description is incorporated herein by reference. In FIG. 7, the unique serial number 316 is 123456789. Any combination of numbers, letters, and/or other characters may be used for the unique serial number 316. In addition, the elements of the unique serial number 316 may be placed on the front side 304 of the cap 302 in any manner or arrangement visible to a consumer. The unique serial number 316 may be placed on the front side 304 of the cap 302 by any known process including but not limited to printing, including 3D printing, imprinting, etching, embossing, and/or debossing. The placement of the unique serial number 316 may be performed at the same time as the formation of the first weakened regions 312 or it may be performed at some other point in the process of forming the identification rivet 300. The description of the unique serial number 116 of the identification rivet 100 is incorporated herein for the unique serial number 316 of the identification rivet 300.

Figure 9:
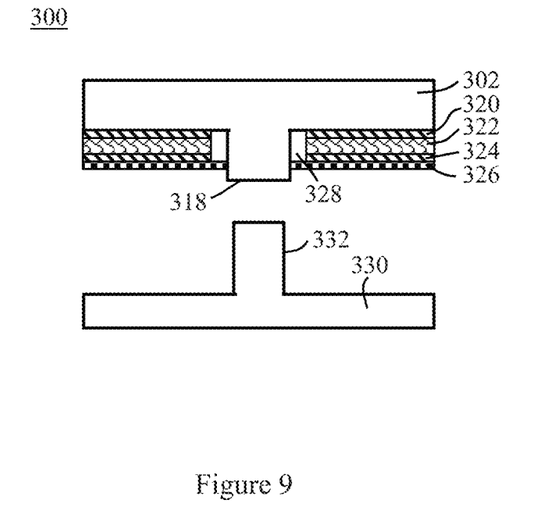
FIG. 9 illustrates a cross-sectional view along line 9-9' of FIGS. 7 and 8.
Figure 10:
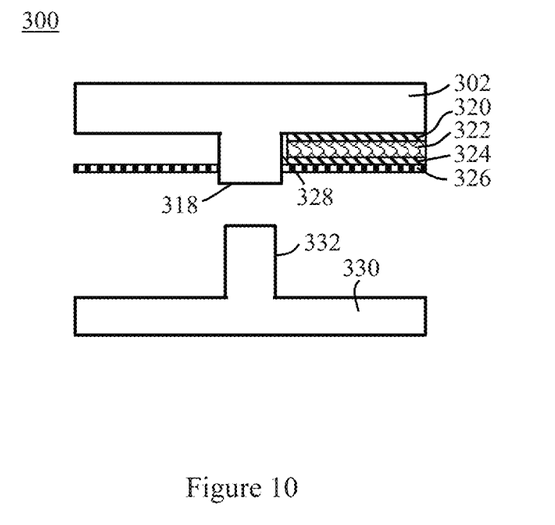
FIG. 10 illustrates a cross-sectional view along line 10-10' of FIGS. 7 and 8.

FIG. 8 illustrates a bottom view of the identification rivet 300 of FIG. 7 after removal of a protective anti-stick film 326 (described with respect to FIGS. 9 and 10). FIG. 8 illustrates the location of the first weakened regions 312 and the second weakened regions 314 on the back side 306 of the cap 302. FIG. 8 further illustrates a second layer of adhesive 324 formed in areas of the peripheral region 308 surrounding the second weakened regions 314 on the back side 306 of the cap 302. The second layer of adhesive 324 is part of a foam layer arrangement which will be described with respect to FIGS. 9 and 10.

FIG. 9 is a cross-sectional view of the identification rivet 300 taken along line 9-9' of FIGS. 7 and 8. FIG. 10 is a cross-sectional view of the identification rivet 300 taken along line 10-10' of FIGS. 7 and 8. As illustrated in FIGS. 9 and 10, the cap 302 includes a protruding portion 318 extending from the upper portion of the cap 302. The cap 302 further includes a first layer of adhesive 320 on a bottom surface of the upper portion of the cap 302. The upper portion of the cap 302 may be, for example, a metal material. The cap 302 further includes a foam layer 322 adhered to the metal material using the first layer of adhesive 320, a second layer of adhesive 324 on a bottom surface of the foam layer 322, and a protective anti-stick film 326 temporarily attached to the second layer of adhesive 324 to protect the second layer of adhesive 324 until it is adhered to a consumer product (not shown; see Figure ii). Details regarding the properties and formation of the first layer of adhesive 320, the foam layer 322, the second layer of adhesive 324, and the protective anti-stick film 326 are the same as those for the first layer of adhesive 120, the foam layer 122, the second layer of adhesive 124, and the protective anti-stick film 126 of the identification rivet 100, respectively, and those descriptions are incorporated herein in their entirety.

As illustrated in FIGS. 9 and 10, the first layer of adhesive 320, the foam layer 322, and the second layer of adhesive 324 are not formed on the first weakened regions 312 and the second weakened regions 314, leaving a gap 328. Placement of the first layer of adhesive 320, the foam layer 322, and the second layer of adhesive 324 over the first and second weakened regions 312 and 314 is also possible but would act to strengthen these regions and lessen the tamper resistance of the identification rivet 300.

As shown in FIGS. 9 and 10, the identification rivet 300 is a double cap rivet including the cap 302 and a second cap 33o including a barrel 332 that is inserted into the protruding portion 318 to attach to the cap 302 from an opposite side of the product being tagged. In other embodiments, the identification rivet 300 may be a single cap rivet.

In various embodiments, the identification rivet 300 is sized to fit securely over and within an existing hole in a product, for example, in an existing shoelace hole in a sneaker and adhering to the surface material or materials of the sneaker. In one example, the front side 304 of the cap 302 has a diameter ranging from 0.75 cm to 1.25 cm. The protruding portion 318 of the cap 302 has a diameter ranging from 0.2 cm to 0.5 cm. The second cap 33o has a diameter ranging from 0.75 cm to 1.25 cm. The barrel 332 of the cap 33o has a diameter and a height sufficient to ensure the identification rivet 300 securely attaches to the sneaker once the cap 302 and the second cap 330 are pressed together to attach to the sneaker. For example, the diameter of the barrel 332 ranges from 0.15 cm to 0.3 cm, and the height of the barrel 332 ranges from 0.2 cm to 0.4 cm.

Figure 11:
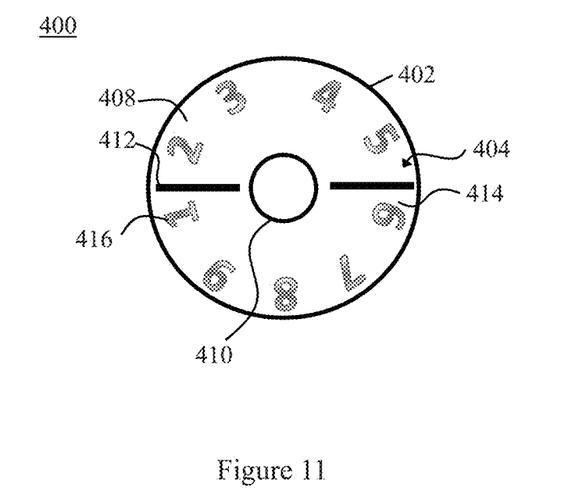
FIG. 11 illustrates a top view of an identification rivet according to another embodiment.
Figure 12:
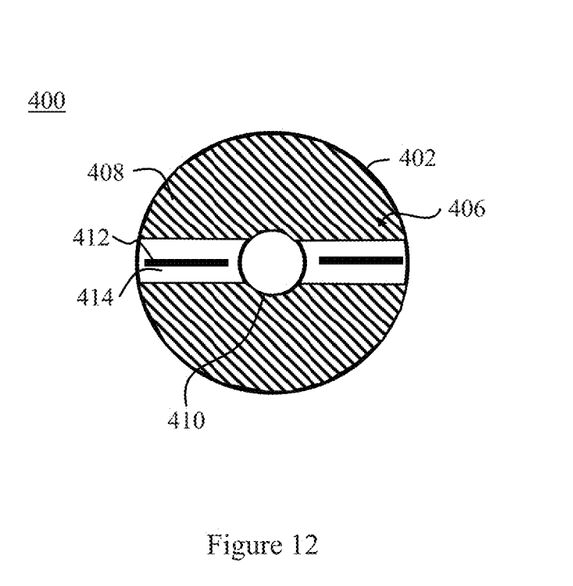
FIG. 12 illustrates a bottom view of the identification rivet of FIG. 11.

Another embodiment of an identification rivet is illustrated with respect to FIGS. 11 and 12. Similar to the embodiment described in FIGS. 7-10, the identification rivet 400 includes a cap 402 having a front side 404 and a back side 406, a peripheral region 408 and a central region 410, first weakened regions 412 and second weakened regions 414, and a unique serial number 416. The embodiment of FIGS. 11 and 12 includes different shapes and arrangements of the first and second weakened regions 412 and 414. The invention is not limited to the illustrated shapes and arrangements; other shapes and arrangements of these elements are also fully within the scope of the present invention. Reference to the teachings regarding the features of FIGS. 7-10 are incorporated herein for the like features of FIGS. 11 and 12.

Figure 13:
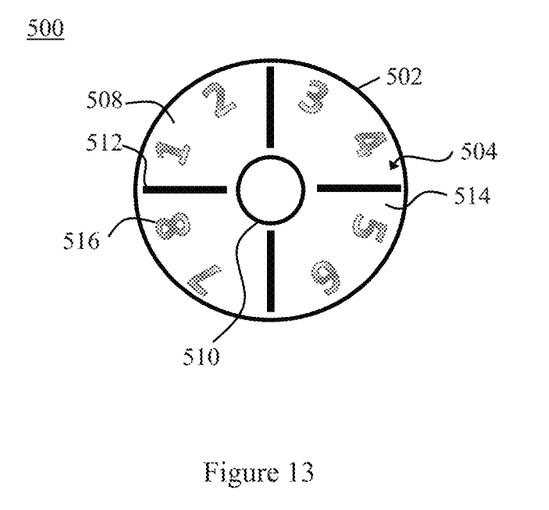
FIG. 13 illustrates a top view of an identification rivet according to another embodiment.
Figure 14:
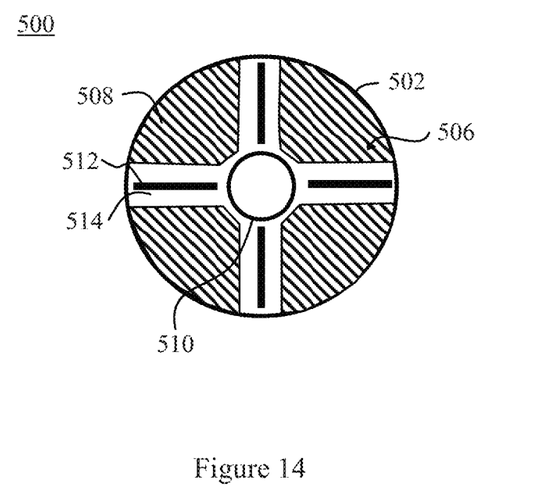
FIG. 14 illustrates a bottom view of the identification rivet of FIG. 13.

Another embodiment of an identification rivet is illustrated with respect to FIGS. 13 and 14. Similar to the embodiment described in FIGS. 7-10, the identification rivet 500 includes a cap 502 having a front side 504 and a back side 506, a peripheral region 508 and a central region 510, first weakened regions 512 and second weakened regions 514, and a unique serial number 516. The embodiment of FIGS. 13 and 14 includes different shapes and arrangements of the first and second weakened regions 512 and 514, and a different arrangement of the unique serial number 516 of 12345678. The invention is not limited to the illustrated shapes and arrangements; other shapes and arrangements of these elements are also fully within the scope of the present invention. Reference to the teachings regarding the features of FIGS. 7-10 are incorporated herein for the like features of FIGS. 13 and 14.

Figure 15:
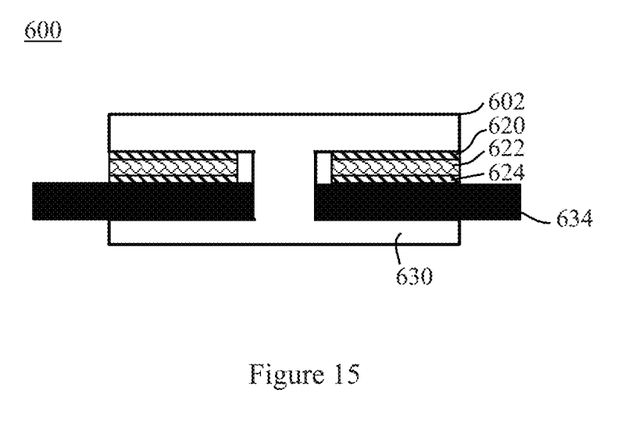
FIG. 15 illustrates a cross-sectional view of an identification rivet adhered to a consumer product according to an embodiment.

FIG. 15 illustrates a cross-sectional view of an identification rivet adhered to a consumer product according to an embodiment. The identification rivet 600 includes a cap 602 and a second cap 630 on opposite sides of a consumer product 634. The consumer product 634 may be any consumer product that may be labeled with a rivet, such as, for example, a sneaker, a purse, or a jacket. Protrusions of the cap 602 and the second cap 630 are mated together to attach the rivet 600 to the consumer product 634. The protrusions may join in a pre-existing opening in the consumer product 634 or an opening may be formed in the consumer product 634 to receive the protrusions. The cap 602 and the second cap 630 may be mated together using a rivet gun. Alternatively, the cap 602 and the second cap 630 may be mated together using any other method known to those of skill in the art.

The identification rivet 600 includes a foam layer 622 that is adhered to a bottom surface of the cap 602, such as a metal bottom surface, with a first layer of adhesive 62o. The foam layer 622 is also adhered to a surface of the consumer product 634 with a second layer of adhesive 624. Details regarding the properties and formation of the first layer of adhesive 62o, the foam layer 622, and the second layer of adhesive 624, are the same as those for the first layer of adhesive 120, the foam layer 122, and the second layer of adhesive 124, of the identification rivet 100, respectively, and those descriptions are incorporated herein in their entirety.

The identification rivets 100, 200, 300, 400, 500, 60o provide multiple mechanisms for tamper detection. Attempting to remove the identification rivet 100, 200, 300, 400, 500, 60o to reuse with another product, for example, a counterfeit pair of shoes, will result in a tear and/or obvious deformation in the upper portion of the identification rivet 100, 200, 300, 400, 500, 60o as a result of the first and second weakened portions 112, 212, 312, 412, 512 and 114, 214, 314, 414, 514 and/or in a damaged foam layer 122, 222, 322, 422, 522, 622 and/or in a broken seal between the foam layer 122, 222, 322, 422, 522, 622 and the tagged product 634. A purchaser will be able to see, through a basic visual inspection, whether the rivet has been torn or deformed, the foam has been damaged, or the seal between the rivet and the fabric of the authenticated product has been broken due to a seller removing the identification rivet 100, 200, 300, 400, 500, 60o from an authenticated product and reattaching it to a counterfeit product. Likewise, a purchaser will be able to inspect the unique serial number 116, 216, 316, 416, 516 and compare it to the accompanying certificate as well as to the blockchain records to ensure they match. Accordingly, embodiments of the present invention allow a purchaser to easily confirm the authenticity of a product prior to purchasing the product.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rivet comprising:
   a first cap having a front side and a back side, wherein the first cap comprises:
      a compressed region or a slotted region between a first edge of the first cap and a second edge of the first cap;
      a unique identifier on the front side of the first cap;
      a protruding portion extending from a central region on the back side of the first cap;
      a foam layer adhered to the back side of the first cap with a first layer of adhesive; and a protective film adhered to the foam layer with a second layer of adhesive.

2. The rivet of claim 1, wherein the first cap comprises the compressed region, wherein the first cap comprises a metal material, and wherein the compressed region comprises a crimped line of the metal material.

3. The rivet of claim 1, wherein the first cap comprises the slotted region, wherein the first cap comprises a metal material, and wherein the slotted region comprises at least one opening formed through the metal material.

4. The rivet of claim 1, wherein the first layer of adhesive, the foam layer, and the second layer of adhesive are not formed in the compressed region or in regions immediately surrounding the compressed region or in the slotted region or in regions immediately surrounding the slotted region.

5. The rivet of claim 4, wherein the second layer of adhesive is configured to adhere to an article for sale, and wherein the first cap is configured to tear or to change shape in the compressed region or the slotted region when the first cap is removed from the article.

6. The rivet of claim 4, wherein the second layer of adhesive is configured to adhere to an article for sale, and wherein the first cap is configured to tear or to change shape in the regions immediately surrounding the compressed region or in the regions immediately surrounding the slotted region when the first cap is removed from the article.

7. The rivet of claim 4, wherein the second layer of adhesive is configured to adhere to an article for sale, and wherein the foam layer is configured to tear or to detach from the back side of the first cap when the first cap is removed from the article.

8. The rivet of claim 1, wherein the unique identifier corresponds to a non-fungible token certificate recorded on a blockchain.

9. The rivet of claim 1, wherein the foam layer comprises a closed-cell ethylene-vinyl-acetate (EVA) or an expanded thermoplastic polyurethane (eTPU) material.

10. The rivet of claim 1, wherein the first layer of adhesive and the second layer of adhesive each comprise an epoxy-based adhesive.

11. The rivet of claim 10, wherein the first layer of adhesive and the second layer of adhesive comprise a same material or a different material.

12. The rivet of claim 1, further comprising a second cap comprising a barrel, wherein the barrel is configured to mate with the protruding portion of the first cap.

13. A rivet comprising:
a first cap comprising an upper portion and a protruding portion, wherein the upper portion and the protruding portion each comprise a metal material, and wherein the upper portion comprises:
at least one compressed region or at least one perforated region;
a unique identifier on an upper surface of the upper portion, wherein the unique identifier comprises a unique serial number that corresponds to a non-fungible token certificate on a blockchain;
a foam layer adhered to a lower surface of the upper portion, opposite the upper surface, wherein the foam layer is adhered by a first layer of adhesive; and
a second layer of adhesive on the foam layer, wherein the second layer of adhesive is configured to adhere the first cap to an article for sale; and
a second cap comprising a primary portion and a barrel portion extending from the primary portion, wherein the second cap is configured to mate with the first cap when the rivet is attached to the article.

14. The rivet of claim 13, wherein:
the protruding portion of the first cap extends from a central region on a back side of the upper portion, and wherein the protruding portion is configured to be placed in an opening in the article; and
the barrel portion of the second cap extends from a central region of the primary portion, and wherein the barrel portion is configured to mate with the protruding portion of the first cap from an opposite side of the opening in the article.

15. The rivet of claim 13, wherein the upper portion of the first cap comprises:
a circular shape; and
at least three compressed regions, wherein the at least three compressed regions each comprise an arced line extending from a first edge of the first cap to a second edge of the first cap, and wherein the at least three compressed regions are spaced around the upper portion of the first cap.

16. The rivet of claim 13, wherein the upper portion of the first cap comprises at least two perforated regions, wherein the at least two perforated regions each comprise at least one slot through the metal material of the upper portion of the first cap, and wherein the at least two perforated regions are spaced apart on the upper portion of the first cap.

17. The rivet of claim 13, wherein the first layer of adhesive, the foam layer, and the second layer of adhesive are not formed in the at least one compressed region or regions immediately adjacent the at least one compressed region or in the at least one perforated region or regions immediately adjacent the at least one perforated region.

18. The rivet of claim 13, wherein the foam layer comprises a closed-cell ethylene-vinyl-acetate (EVA) or an expanded thermoplastic polyurethane (eTPU) material, and wherein the first layer of adhesive and the second layer of adhesive each comprise an epoxy-based adhesive.

19. A tamper resistant rivet comprising:
a cap comprising a metal material, wherein the metal material comprises at least three compressed lines, each of the at least three compressed lines comprising a curved line extending from a first location on an outer edge of the cap towards a central region of the cap to a second location on the outer edge of the cap;
a unique identifier on an upper surface of the cap, wherein the unique identifier comprises a unique serial number that corresponds to a non-fungible token certificate on a blockchain;
at least three foam segments adhered to a lower surface, opposite the upper surface, of the cap in regions between the at least three compressed lines, wherein the at least three foam segments are adhered by a first adhesive;
a second adhesive on the at least three foam segments, wherein the second adhesive is configured to adhere the cap to a resale item; and
a protective film covering each of the at least three foam segments, wherein the protective film is adhered to the at least three foam segments by the second adhesive.

20. The tamper resistant rivet of claim 19, wherein the protective film is configured to be removed from the cap to allow the second adhesive to adhere to the resale item.

* * * * *